(12) United States Patent
Ulichney et al.

(10) Patent No.: US 12,504,739 B2
(45) Date of Patent: Dec. 23, 2025

(54) SYSTEM AND METHOD FOR GENERATING THREE-DIMENSIONAL LATTICED CONDUCTIVE ELEMENTS

(71) Applicant: Peridot Print LLC, Palo Alto, CA (US)

(72) Inventors: Robert Ulichney, Stow, MA (US); Jarrid Wittkopf, Palo Alto, CA (US); Matthew Gaubatz, Seattle, WA (US)

(73) Assignee: Peridot Print LLC, Palo Alto, CA (US)

( * ) Notice: Subject to any disclaimer, the term of this patent is extended or adjusted under 35 U.S.C. 154(b) by 364 days.

(21) Appl. No.: 18/017,378

(22) PCT Filed: Jul. 22, 2020

(86) PCT No.: PCT/US2020/042986
§ 371 (c)(1),
(2) Date: Jan. 20, 2023

(87) PCT Pub. No.: WO2022/019896
PCT Pub. Date: Jan. 27, 2022

(65) Prior Publication Data
US 2023/0288911 A1    Sep. 14, 2023

(51) Int. Cl.
*G05B 19/4099* (2006.01)
*B22F 10/85* (2021.01)
*B33Y 50/02* (2015.01)

(52) U.S. Cl.
CPC .......... *G05B 19/4099* (2013.01); *B22F 10/85* (2021.01); *B33Y 50/02* (2014.12); *G05B 2219/49023* (2013.01)

(58) Field of Classification Search
CPC .................................................. G05B 19/4099
See application file for complete search history.

(56) References Cited

U.S. PATENT DOCUMENTS 9,486,878 B2    11/2016  Buller et al.
9,789,651 B2    10/2017  Musuvathy et al.
(Continued)

FOREIGN PATENT DOCUMENTS

CN          105020566 B     9/2017
WO      WO-2015136277 A1 *  9/2015  ............. B22F 10/00
(Continued)

OTHER PUBLICATIONS

Hussein, A., et al., "Advanced lattice support structures for metal additive manufacturing", Journal of Materials Processing Technology, vol. 213, Issue 7, Jul. 2013, pp. 1019-1026.

*Primary Examiner* — Suresh Suryawanshi
(74) *Attorney, Agent, or Firm* — Shook, Hardy & Bacon L.L.P.

(57) ABSTRACT

In one example in accordance with the present disclosure, a system is described. The system includes a model generator that includes a processor and memory. The model generator obtains an input that indicates a property of a conductive element to be printed and obtains a template which defines a lattice structure for the conductive element. The model generator also generates a latticed conductive element model based on the template and the input. The system also includes a three-dimensional printing controller to trigger selective hardening of build material to form the latticed conductive element.

15 Claims, 10 Drawing Sheets

(56) References Cited

U.S. PATENT DOCUMENTS

| | | | |
|---|---|---|---|
| 2014/0145522 A1* | 5/2014 | Gershenfeld | F16B 3/00 |
| | | | 310/10 |
| 2016/0380634 A1* | 12/2016 | Ghanea-Hercock | H03K 19/20 |
| | | | 326/111 |
| 2017/0083003 A1* | 3/2017 | Arisoy | G06F 30/00 |
| 2017/0329878 A1 | 11/2017 | Gondek et al. | |
| 2017/0341183 A1 | 11/2017 | Buller et al. | |
| 2019/0007486 A1* | 1/2019 | Cook | H04B 5/20 |
| 2019/0143605 A1* | 5/2019 | Huang | B29C 64/393 |
| | | | 425/135 |
| 2020/0130282 A1 | 4/2020 | Fan et al. | |

FOREIGN PATENT DOCUMENTS

| | | | |
|---|---|---|---|
| WO | WO-2018199943 A1 * | 11/2018 | B22F 10/14 |
| WO | 2020/091724 A1 | 5/2020 | |
| WO | 2020/122897 A1 | 6/2020 | |

* cited by examiner

SYSTEM AND METHOD FOR GENERATING THREE-DIMENSIONAL LATTICED CONDUCTIVE ELEMENTS

BACKGROUND

Additive manufacturing systems produce three-dimensional (3D) objects by building up layers of material. Some additive manufacturing systems are referred to as "3D printing devices" and use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems form a three-dimensional (3D) object through the solidification of layers of build material. Additive manufacturing systems make objects based on data in a 3D model of the object generated, for example, with a computer-aided drafting (CAD) computer program product. The model data is processed into slices, each slice defining portions of a layer of build material that are to be solidified.

In one example, to form the 3D object, a build material, which may be powder, is deposited on a bed. A fusing agent is then dispensed onto portions of a layer of build material that are to be fused to form a layer of the 3D object. The system that carries out this type of additive manufacturing may be referred to as a powder and fusing agent-based system. The fusing agent disposed in the desired pattern increases the energy absorption of the layer of build material on which the agent is disposed. The build material is then exposed to energy such as electromagnetic radiation. The electromagnetic radiation may include infrared light, ultraviolet light, laser light, or other suitable electromagnetic radiation. Due to the increased heat absorption properties imparted by the fusing agent, those portions of the build material that have the fusing agent disposed thereon heat to a temperature greater than the fusing temperature for the build material.

Accordingly, as energy is applied to a surface of the build material, the build material that has received the fusing agent, and therefore has increased energy absorption characteristics, fuses while that portion of the build material that has not received the fusing agent remains in powder form. Those portions of the build material that receive the agent and thus have increased heat absorption properties may be referred to as fused portions. By comparison, the applied heat is not so great so as to increase the heat of the portions of the build material that are free of the agent to this fusing temperature. Those portions of the build material that do not receive the agent and thus do not have increased heat absorption properties may be referred to as unfused portions.

Accordingly, a predetermined amount of heat is applied to an entire bed of build material, the portions of the build material that receive the fusing agent, due to the increased heat absorption properties imparted by the fusing agent, fuse and form the object while the unfused portions of the build material are unaffected, i.e., not fused, in the presence of such application of thermal energy. This process is repeated in a layer-wise fashion to generate a 3D object. The unfused portions of material can then be separated from the fused portions, and the unfused portions recycled for subsequent 3D formation operations.

Another way of 3D formation selectively applies binder to areas of loose build material. In this example, a "latent" part is prepared inside a build bed filled with build material. The build bed may be transferred to a furnace where a first heating operation removes solvents present in the applied binder. As solvents are removed, the remaining binder hardens and glues together build material to convert the "latent" part into a "green" part. The green part is then removed from the bed. As a result of this operation, residual build material may be caked onto the green parts. It may be desirable to remove residual build material from green parts in a cleaning operation. In some examples, the green parts are loaded into a sintering furnace where applied heat can cause binder decomposition and causes the build material powder particles to sinter or fuse together into a durable solid form.

In yet another example, a laser, or other power source is selectively aimed at a powder build material, or a layer of a powder build material, to form a slice of a 3D printed part. Such a process may be referred to as selective laser sintering. In yet another example, the additive manufacturing process may use selective laser melting where portions of the powder material, which may be metallic, are selectively melted together to form a slice of a 3D printed part. As yet another example, in fused deposition modeling melted build material is selectively deposited in a layer where it cools. As it cools it fuses together and adheres to a previous layer. This process is repeated to construct a 3D printed part.

In yet another example, the additive manufacturing process may involve using a light source to cure a liquid resin into a hard substance. Such an operation may be referred to as stereolithography. While such additive manufacturing operations have greatly expanded manufacturing and development possibilities, further development may make 3D printing a part of even more industries. Accordingly, a device which carries out any of these additive manufacturing processes may be referred to as an additive manufacturing device and in some cases a printer.

While such additive manufacturing operations have greatly expanded manufacturing and development possibilities, further development may make 3D printing a part applicable in even more industries. For example, some objects may include electronic circuitry. In general, it is possible to place the electrical components in surface or socket mounts after the printing is done. This maneuver, however, may add additional operations, time, and cost to the manufacturing process and may be a limitation on the 3D printed object geometry.

Accordingly, the present specification describes the generation of conductive components in the 3D printed object by printing the conductive components. That is, the present specification describes systems and methods for creating 3D printed conductive elements using additive manufacturing operations. These 3D printed conductive elements may be generated using any number of the aforementioned additive manufacturing devices which allow for the digital control of material and multi-fluid placement in a powder bed. With this, selective control is provided over which parts of the powder will be heated and fused, as well as the ability to deliver unique properties to a scale of 10s of microns.

The 3D printed conductive elements are formed using a conductive agent such as a nanoparticle ink. The metal in the nanoparticle ink may be silver or copper. This conductive agent is added along with the fusing agent, and other agents, during the build process. Upon application of heat, the conductive material in the conductive agent sinters along with the fusing of the powdered build material. In other words, the additive manufacturing process builds the entire 3D printed object, conductive elements included, simultaneously. The present specification generates conductive elements that make an efficient use of the conductive material and ensure good mechanical and electrical properties. By utilizing the voxel control of an additive manufacturing process, electronic properties of the addressable voxels in a 3D print are controlled.

While additive manufacturing may provide an effective way of incorporating conductive elements into 3D printed objects, some developments may enhance their more complete implementation. For example, metals, such as silver or copper used for conductive elements in 3D printed electronics may be costly. That is, to achieve a desired conductivity per unit length, conductive traces may be 3D printed as solidly-filled conduits with metal agent voxels. The present specification, however, describes a latticed conduit which may maintain a desired conductivity per unit length, but doing so using less material. Accordingly, the present specification may conserve the valuable metal nanoparticle ink.

Moreover, in some additive manufacturing devices, the conductivity achieved in different print dimensions is not symmetric. For example, it may be the case that conductivity is higher in the X and Y dimensions than conductivity in the Z dimension. Accordingly, in solidly-filled conduits, extraneous metal nanoparticle ink in the Z dimension may be wasted as it does not contribute to the overall conductivity of the conductive element.

Still further, a solidly-filled conduit may affect dimensional accuracy. For example, when the powdered build material receives the conductive agent, the conductive agent may "spill" or bleed onto lower layers. This leaked conductive agent may sinter as well, thus altering the dimensional accuracy of the resulting 3D printed conductive elements.

Accordingly, the present specification describes systems and methods that provide for printing fewer metal voxels to achieve a similar conductivity as solid conductive elements by printing latticed conductive elements.

Specifically, the present system generates a model for conductive element formation. The system adds a conductive material to the 3D printed object, which conductive material is in a lattice pattern with a selected density. Such a latticed structure produces a conductive element connecting two locations in the object.

Further, metal conservation may be achieved by varying the density structure of the conductive elements to have asymmetric conductivity. That is, the present specification describes a computationally efficient method of printing variable density connected structures that use fewer metal voxels than solid-fill conductive elements. The present specification also leverages the difference in conductivity as a function of print dimension to reduce waste. The metal savings decreases the material cost of the 3D printed object and reduces the thermal effect on surrounding voxels to make the process more amenable to having desirable conductivity and mechanical properties with 3D printed conductive elements being able to be printed anywhere in the 3D printed object.

Specifically, the present specification describes a system. The system includes a model generator which has a processor and memory. The model generator obtains 1) an input that indicates a property of a conductive element to be printed and 2) a template which defines a lattice structure for the conductive element. The model generator generates a latticed conductive element model based on the template and the input. The system also includes a 3D printing controller to trigger selective hardening of build material to form the latticed conductive element.

The present specification also describes a method. According to the method, an input is obtained that indicates a property of a conductive element to be printed. A template is also obtained, which template defines a lattice structure for the conductive element. A latticed conductive element model is generated based on the template and the input.

The present specification also describes a non-transitory machine-readable storage medium encoded with instructions executable by a processor. The machine-readable storage medium includes instructions. The instructions, when executed by the processor, obtain an input matrix that indicates an electrical property of a conductive element to be printed, obtain a template matrix which defines a lattice structure for the conductive element and generates a latticed conductive element model by generating multiple regions of the latticed conductive element model. Different regions call for different densities of conductive compound to be deposited.

Such systems and methods 1) allow for printing of conductive elements in a 3D printed object, 2) simplify the incorporation of electrical components into a 3D printed object by reducing the number of components placed in/on the 3D printed object; 3) reduce the constraints caused from placing lumped electrical components in/on the 3D printed object; 4) conserve conductive agent used to form electrical components; 5) ensure dimensional accuracy of conductive components as well as of the 3D printed object; 6) provide an enhanced conductivity-to-metal ratio; 7) provide a tailored directional asymmetry; 8) increase thermal control of conductive traces as well as of a surrounding 3D printed object; and 9) enhance mechanical properties while maintaining higher conductivity. However, it is contemplated that the systems and methods disclosed herein may address other matters and deficiencies in a number of technical areas.

Figure 1:
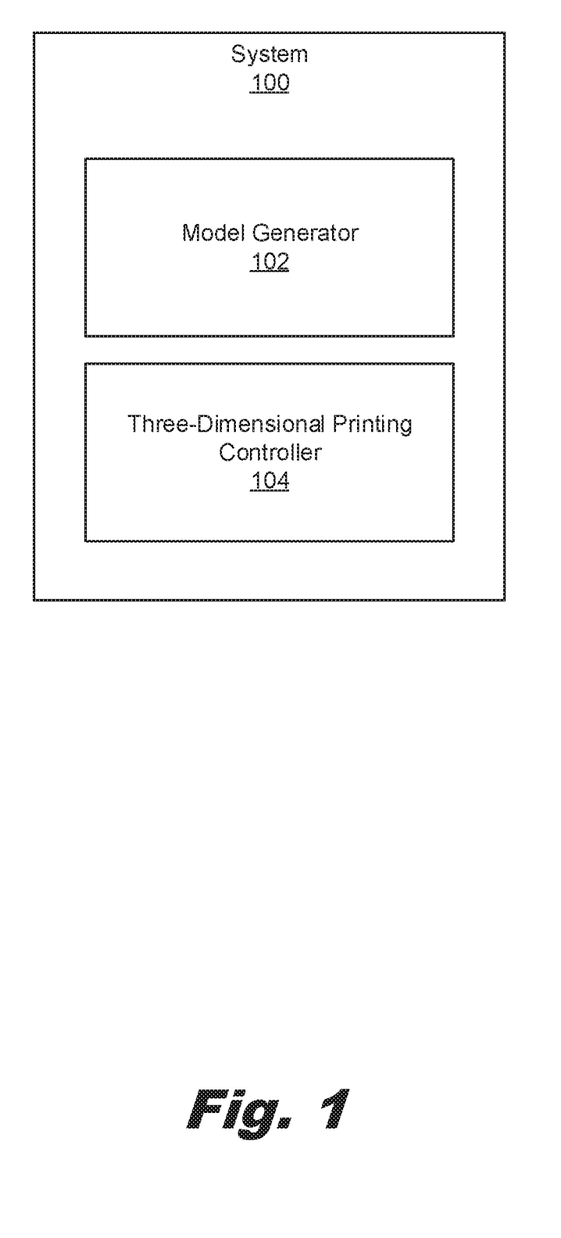
FIG. 1 is a block diagram of a system for generating three-dimensional (3D) latticed conductive elements, according to an example of the principles described herein.

Turning now to the figures, FIG. 1 is a block diagram of a system (100) for generating three-dimensional (3D) latticed conductive element models, according to an example of the principles described herein.

In general, the system (100) operates to determine the effective amount of conductive agent used to form conductive elements, all while maintaining a desired conductivity for the conductive elements. Specifically, to determine the amount of conductive material used, the system (100) generates a model which represents the conductive element as a latticed structure and then controls an additive manufacturing device to form the latticed conductive element. In some examples, the system (100) operates to reduce the effective amount of conductive agent used to form conductive elements, all while maintaining a desired conductivity for the conductive elements. While specific reference is made to controlling the effective amount of conductive agent to reduce the amount, in some examples the system (100) may control the amount for a variety of reasons. For example, the system (100) may control the amount of conductive agent to impart a particular mechanical strength or heat conductivity into the conductive element. As used in the present specification, the term conductive element may refer to any number of electrical components such as contact pads, ground/power planes, and electrical traces.

In some examples, the system (100) may be separate from the additive manufacturing device and may communicate the model and/or control signals to the additive manufacturing device via a wired or wireless connection. In this example, the system (100) may be disposed on a computing device. In another example, the system (100) is integrated with the additive manufacturing device. For example, the system (100) may be found on the same physical structure as the additive manufacturing components.

Specifically, the system (100) includes a model generator (102). The model generator (102) may include various hardware components, which may include a processor and memory. The processor may include the hardware architecture to retrieve executable code from the memory and execute the executable code. As specific examples, the model generator (102) as described herein may include a computer readable storage medium, a computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the model generator (102), cause the model generator (102) to implement at least the functionality of generating a model for a latticed conductive element as described below.

Specifically, the model generator (102) obtains an input that indicates a property of a conductive element to be printed. Such an input may indicate various physical, mechanical, and/or electrical properties of the conductive element. As one specific example, the input may indicate a conductive element with a shape and size defined by a volume loading of conductive material to be placed in that region. Such an input may be as simple as a coordinate map for the conductive element and a volume loading of conductive agent, which volume loading is selected to achieve a particular conductivity in the region or based on other criteria. In some examples, the input may be a matrix that indicates various properties per unit length. For example, when designing an electrical trace, it may be desirable to have regions of the trace that connect to the contact pads to have higher conductivity as compared to central regions of the electrical trace. In this example, the input may be a matrix that identifies, for different voxels of the conductive element, what the property should be at that point.

The model generator (102) also obtains a template which defines a lattice structure for the conductive element. As one particular example, the model generator (102) may include a database of different lattice structures. Based on a particular received input, a latticed structure may be selected from the database. For example, a user via a particular interface or by uploading a design file defining the conductive element, may identify particular characteristics of a particular conductive element. As a specific example, a computer-aided drafting (CAD) file may indicate a conductive trace has a particular length, has a particular cross-sectional area, and is intended to pass current within a particular range. Based on these criteria or others, the model generator (102) may select a template which defines a lattice structure for the conductive element with those characteristics. While particular reference is made to a few characteristics, other characteristics may be used by the model generator (102) to select a particular lattice structure from a database. Examples of other characteristics include desired conductivity, type of conductive element, (i.e., contact pad, trace, ground/power plane), desired mechanical robustness, location within a 3D printed object, and an application for the conductive element.

A template may be selected based on these characteristics. Each template may have different parameters, for example each template may identify a pattern for the lattice, lattice arm length, and lattice vertex geometry, etc. While particular reference is made to a few characteristics, other characteristics may be identified in a particular template.

In another example, the template may be defined as a matrix. As will be described below in connection with FIG. 4, the template matrix may be a threshold matrix, that, when compared with a target agent loading percentage, i.e., an input matrix, will generate the latticed conductive element model.

The model generator (102) also generates the latticed conductive element model based on the input and the template. In the example where the model generator (102) includes a database, this operation may include selecting a template based on the input characteristics, whatever those input characteristics may be.

In an example where the template is a matrix of threshold values, the model generator (102) may generate the lattice structures based on the received volume loading inputs. For example, the model generator (102) may determine a thickness of lattice arms of the lattice structure. As a particular example, an input may be in the form of a volume percentage loading for a solidly-formed conductive conduit. That is, the input may be what volume loading would be used if a solidly-formed conductive conduit was formed inside the same region where the lattice structure is to exist. A specific numeric example would be a user inputting a 10% volume loading, indicating a 10% volume of conductive agent would be used were a solidly-filled trace to be formed. In this example, the model generator (102) may obtain the template matrix and model the lattice arms to have a first thickness. By comparison, the model generator (102) may receive an input of a 30% volume loading, indicating a 30% volume of conductive agent would be used were a solidly-filled trace to be formed. In this example, the model generator (102) may obtain the template matrix and model the lattice arms to have a second thickness, which second thickness is greater than the first thickness. Accordingly, the model generator (102) receives an input in units of % volume for a solidly-filled conductive element and outputs a model where lattice structure arm thicknesses are such that the overall conductive agent density of the latticed conductive element is the same as if the solidly-filled conductive element were formed in a proportional volume of the entire lattice structure region for which the loading is defined.

As will be described below, in some examples the generated lattice structures may not be uniform across the 3D printed latticed conductive element. That is, a conductive element may include multiple regions, and different regions may have different electrical properties. As another example, a conductive element may have varying properties per unit length as described above. Accordingly, such a model generator (102) may generate a wide variety of latticed conductive elements that maintain a desired conductivity and reduce overall agent usage.

The system (100) also includes a three-dimensional printing controller (104) to trigger selective hardening of build material to form the latticed conductive element. The three-dimensional printing controller (104) may include various hardware components, which may include a processor and memory. The processor may include the hardware architecture to retrieve executable code from the memory and execute the executable code. As specific examples, the controller as described herein may include a computer readable storage medium, a computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the three-dimensional printing controller (104), cause the three-dimensional printing controller (104) to implement at least the functionality of triggering selective hardening of build material to form the latticed conductive element as described below.

The three-dimensional printing controller (104) controls the additive manufacturing. That is, the three-dimensional printing controller (104) instructs the additive manufacturing device to form the 3D printed object and the conductive element which may be disposed therein. Specifically, in a fusing agent-based system, the three-dimensional printing controller (104) may direct a build material distributor to add a layer of build material. Further, the three-dimensional printing controller (104) may send instructions to direct a printhead of an agent distributor to selectively deposit the agent(s) onto the surface of a layer of the build material. The three-dimensional printing controller (104) may also direct the printhead to eject the agent(s) at specific locations to form a 3D printed object slice.

In one particular example, the three-dimensional printing controller (104) controls the agent distributor to form a conductive element as defined by the model generator (102). Such conductive elements are formed by depositing conductive agent in a particular pattern. Accordingly, the three-dimensional printing controller (104) controls deposition of the conductive agent to form the latticed conductive elements. That is, the three-dimensional printing controller (104) instructs the additive manufacturing device to deposit conductive agent in regions that are intended to form the latticed conductive elements.

The conductive agent may include conductive nanoparticles in a carrier fluid. Examples of conductive particles that are disposed in the carrier fluid may include silver nanoparticles, copper nanoparticles, gold nanoparticles, nickel nanoparticles, platinum nanoparticles, conductive carbon materials (carbon nanotubes, graphene, graphene oxide, etc.), conductive organic polymers, metal organic salts (copper formate, silver oxalate, etc.), metal organic decomposition inks (these inks take the form MX where M is the metal in a cationic or positive valence state and X is the anion of the salt and may be some carbon-containing anion that can decompose at low temperatures and donate its electrons to reduce the metal cation to the metallic state). In these examples, the relative loading of the conductive component may be determined by the target conductivity of the capacitor. The three-dimensional printing controller (104) may also selectively activate a heat source, such as a laser or lamp, to fuse build material that has received conducting agent and/or fusing agent.

Figure 2:
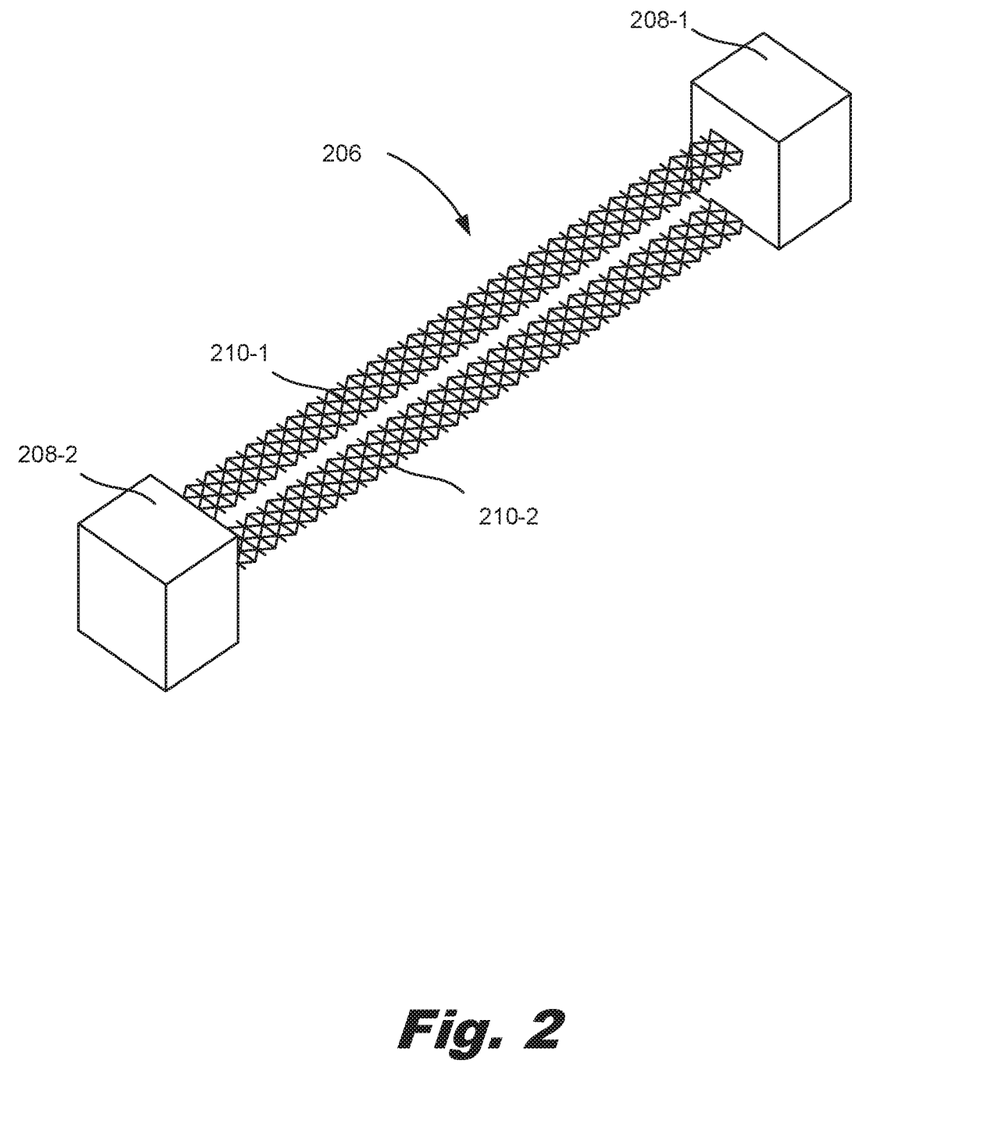
FIG. 2 is an isometric view of a 3D latticed conductive element, according to an example of the principles described herein.

FIG. 2 is an isometric view of a 3D latticed conductive element, according to an example of the principles described herein. As described above, conductive elements may take many forms. In the example depicted in FIG. 2, the conductive element is a conductive trace (206) formed between two contact pads (208-1, 208-2). While FIG. 2 depicts just the trace (206) as a latticed structure, the contact pads (208-1, 208-2) may also be latticed structures. Note that the components depicted in FIG. 2 are not drawn to scale and may be enlarged to illustrate the physical structure of the components.

Figure 9:
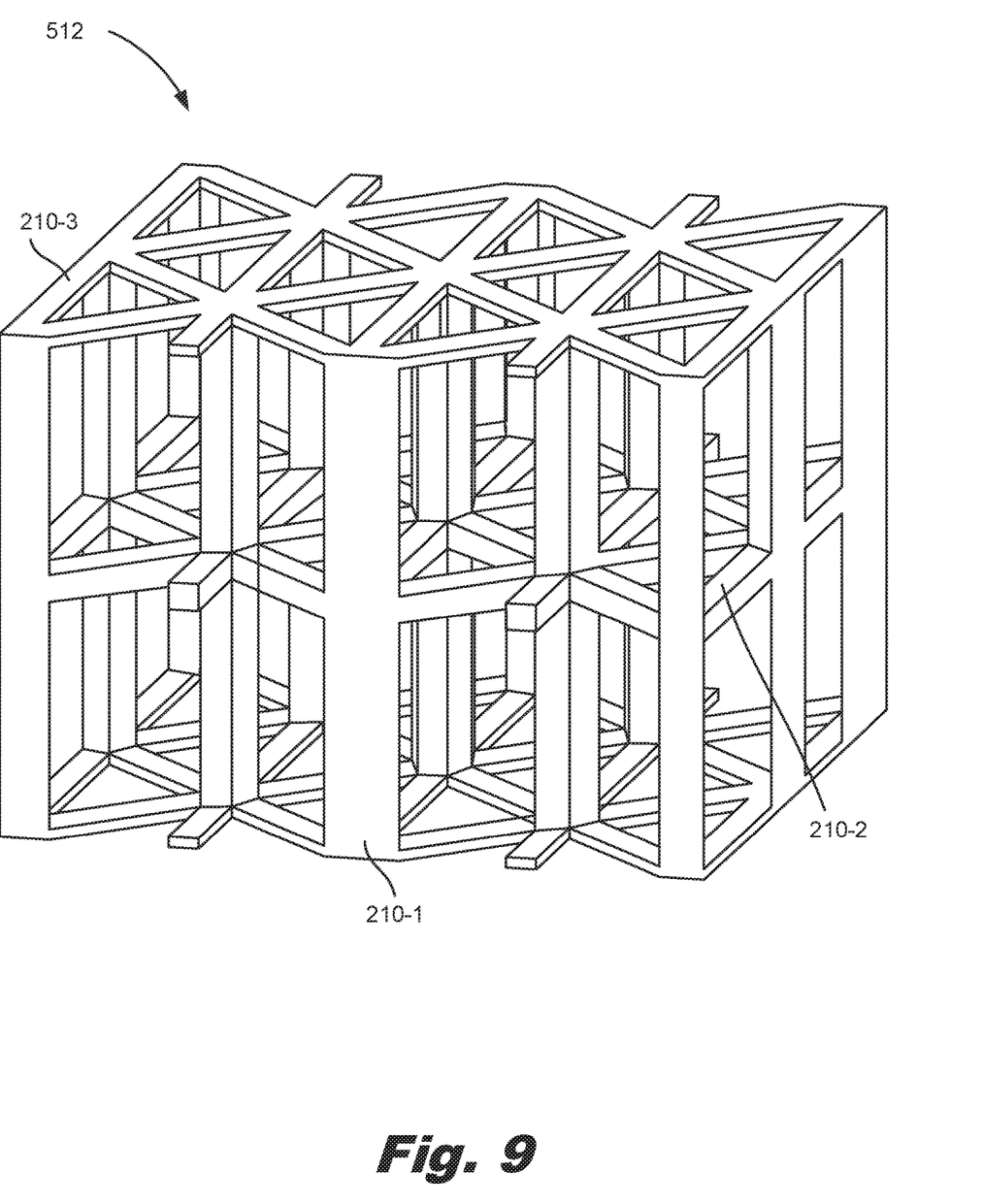
FIG. 9 is an isometric view of a latticed conductive element model, according to an example of the principles described herein.

As depicted in FIG. 2, the latticed conductive trace (206) is not a solid-filled conduit between the contact pads (208), but is a conductive trace (206) that uses less conductive material. In some examples, such as that depicted in FIG. 2, the conductive element may include multiple regions (210-1, 210-2) of lattice structures. In some examples, vertical lattice arms may join adjacent regions (210) of lattice structures as depicted in FIG. 9 while in other examples adjacent regions (210) of lattice structures may be separated from one another by non-conductive material which may include fused build material or unfused build material.

In some examples, the different lattice structures in the different regions (210-1, 210-2) may call for different densities of conductive compound to be deposited. In addition, different sub-regions within each lattice structure may call for different densities of conducted compound to be deposited.

Figure 3:
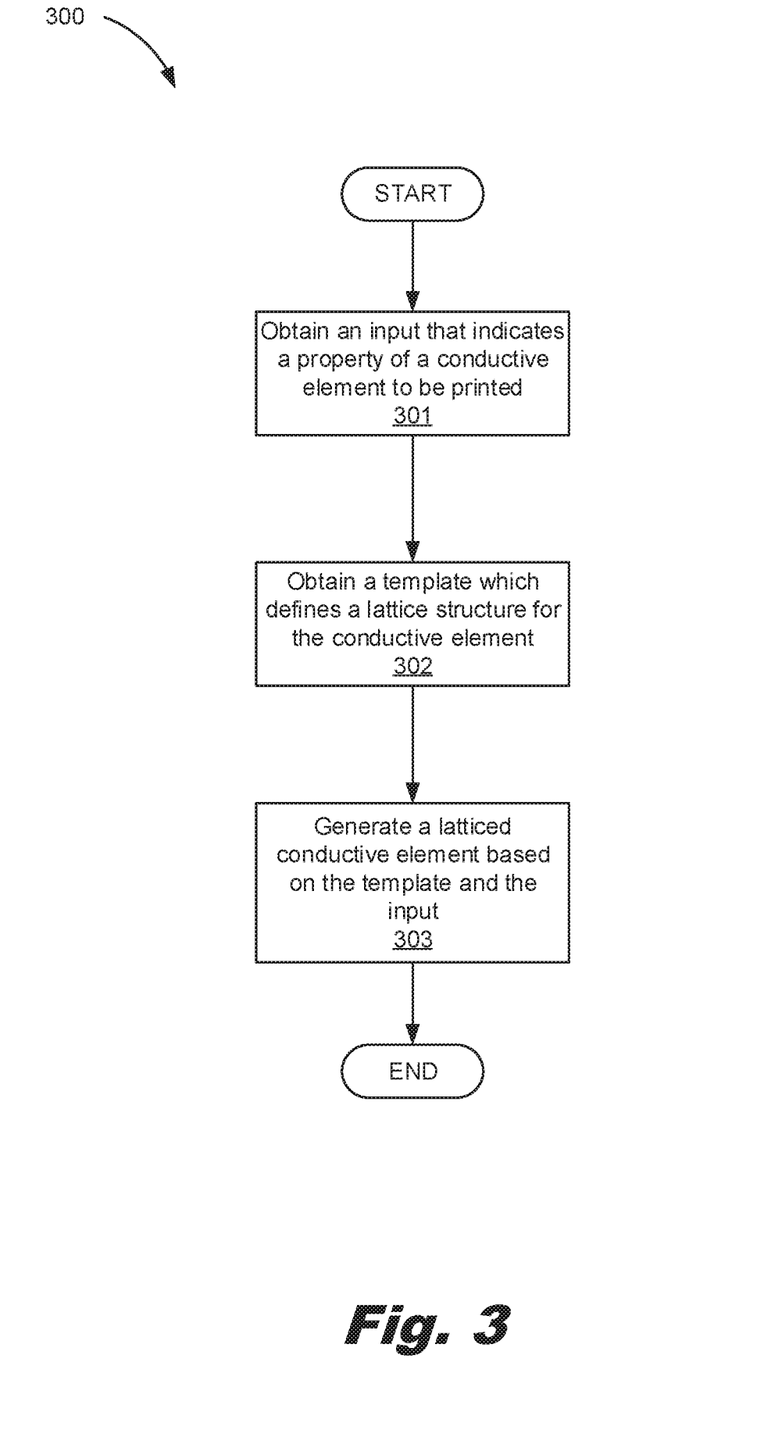
FIG. 3 is a flow chart of a method for forming 3D latticed conductive elements, according to an example of the principles described herein.

FIG. 3 is a flow chart of a method (300) for forming 3D latticed conductive element models, according to an example of the principles described herein. According to the method (300), an input is obtained (block 301) which indicates a property of a conductive element to be printed. As described above, the input may take many forms. As one example, the input may be a volume loading of conductive agent to be placed in a region of a 3D printed object, which region defines the conductive element. For example, it may be that a straight electrical trace (FIG. 2, 206) is to be formed between two contact pads (FIG. 2, 208-1, 208-2) and is desired to have a particular solid-fill loading to impart a desired conductivity. This particular solid-fill loading may be the input received by the model generator (FIG. 1, 102) to generate the latticed conductive element model. In this example, the property is a density of a conductive agent to be deposited relative to a complete, or solid-fill, conductive element. Put another way, the input may be a density of conductive agent to be deposited were a solidly-filled electrical trace used for a proportional volume of a region over which the density is defined.

As another example, the input may reflect an intent, or application for the conductive element. For example, a longer trace may justify a higher conductivity. Accordingly, a length of the trace may be an input such that a template with an appropriate lattice structure may be selected.

As yet another example, the type of conductive element may be the property that is input. For example, contact pads, ground/power planes, and electric traces operate differently and may justify different lattice structures. As yet another example, a target electrical property may be the input. For example, a "high conductivity" value in the input matrix may correspond to a lattice arrangement in the structure with a particular density, whereas a "mechanically strong" electrical property value may correspond to another recipe for the lattice structure orientation as well as for the density value distribution.

While specific reference is made to a single input value, the input may include additional values. For example, the input may indicate the property per unit length of the conductive element. For example, as described above, it may the case that different conductivities are desired along the length of the conductive trace (FIG. 2, 206). Accordingly, the input may indicate, per unit length, what the property at that point is to be.

The method (300) also includes obtaining (block 302) a template which defines a lattice structure for the conductive element. As described above, such a template may be defined as a matrix which includes threshold values that, based on a comparison with an input, may determine characteristics of the resulting latticed conductive elements. Based on the input and the template, a latticed conductive element model is generated (block 303). That is, the template may define a structure for the lattice, which structure may be altered based on input values. In one specific example, generating (block 303) the latticed conductive element model may include generating multiple regions (FIG. 2, 210) of lattice structures of the latticed conductive element model. For example, the conductive element may be formed by depositing multiple layers of unfused powder build material and depositing a conductive agent thereon. In this example, different regions (FIG. 2, 210) may call for different densities of conductive agent to be deposited.

Figure 8:
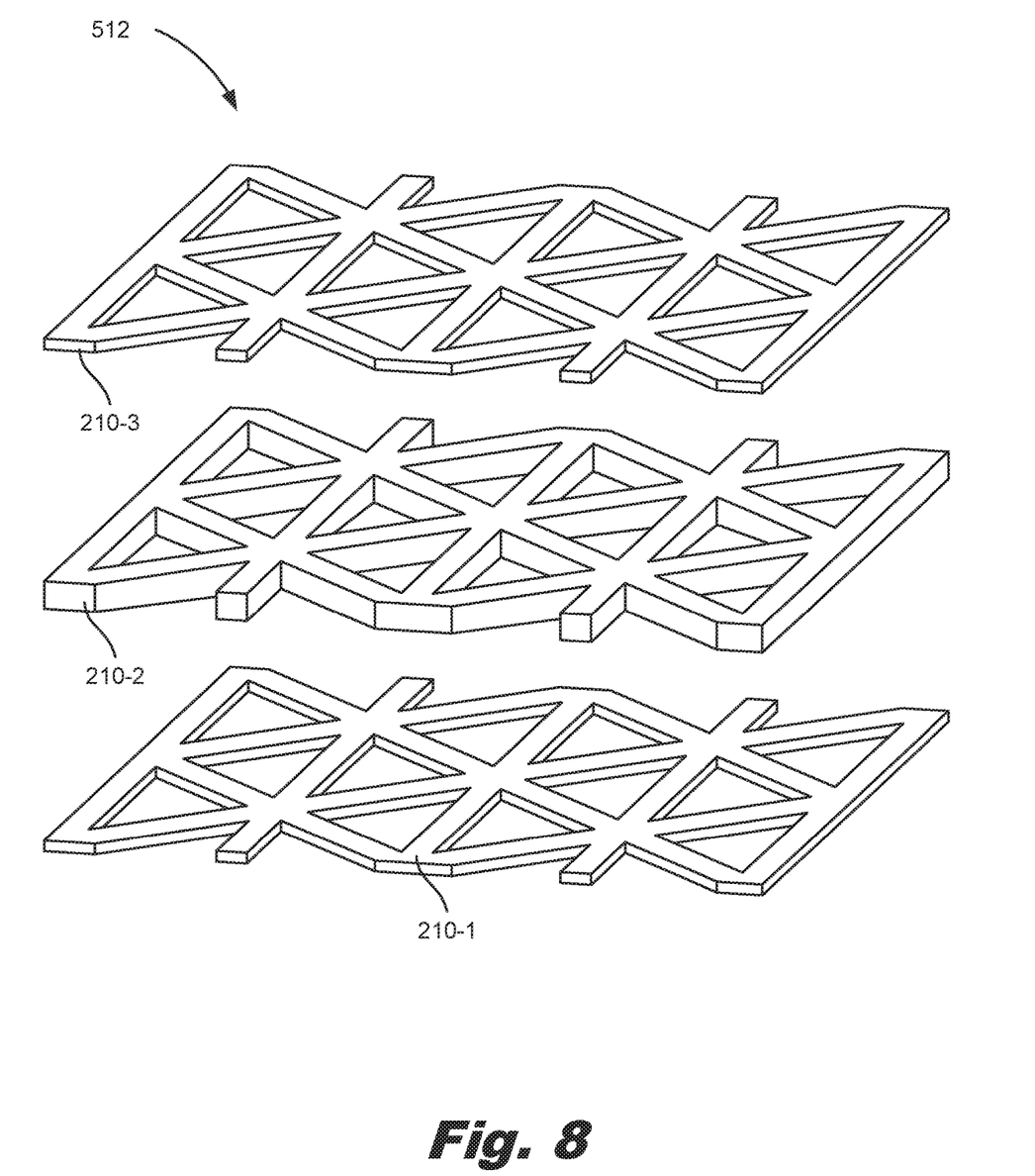
FIG. 8 is an isometric view of a latticed conductive element model, according to an example of the principles described herein.

In one particular example, the template may include lattice arms to electrically connect lattice structures in adjacent regions (FIG. 2, 210) as depicted in FIG. 9. Doing so may increase the conductivity of the latticed conductive element by creating a denser lattice with a greater number of dimensions along which electricity may flow. In other examples, the lattice structures are not connected by lattice arms across regions and instead are separated by unfused powder build material as depicted in FIG. 8.

As a specific example, boundary regions (FIG. 2, 210) of the latticed conductive element, or exterior regions (FIG. 2, 210) may call for a lower density of conductive agent to be deposited as compared to interior regions (FIG. 2, 210). That is, if too much conductive agent is deposited in a region (FIG. 2, 210), the conductive agent may bleed into other regions (FIG. 2, 210). Moreover, if too much conductive agent is deposited on a layer of build material, the conductive agent may bleed down into adjacent layers of build material. The presence of the additional conductive agent may cause these adjacent layers to absorb more thermal energy and over-fuse. Such over-fusing may compromise the structural integrity of the 3D printed object. Moreover, if excess conductive agent saturates a target region (FIG. 2, 210) and bleeds onto regions not intended to form the conductive element, the conductive agent may cause sintering in those regions. Accordingly, the conductive elements may have reduced dimensional accuracy, that is, the bleed may cause a conductive element to be sintered at locations where it is not desired. This reduced dimensional accuracy may affect electrical properties of the conductive element and, in some examples, may result in shorting. By reducing the amount of conductive agent used on exterior regions (FIG. 2, 210), the thermal bleed is reduced so as to increase dimensional accuracy and part strength.

Accordingly, the present method (300) allows for the generation of a conductive trace that 1) reduces the overall amount of conductive material used, 2) maintains a desired conductivity, and 3) promotes dimensional accuracy and part strength. That is, such a latticed conductive element has the same volume loaded, but does so in a more customized fashion as opposed to having a set density/set amount in a conductive element.

Figure 4:
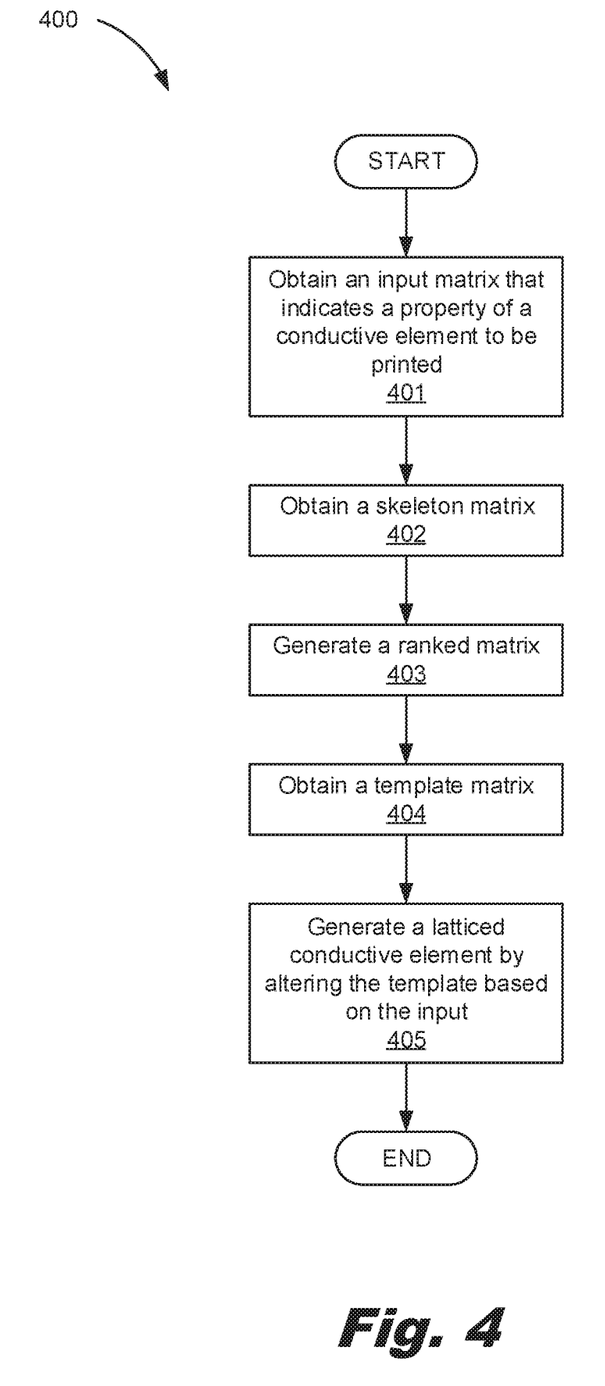
FIG. 4 is a flow chart of a method for forming 3D latticed conductive elements, according to an example of the principles described herein.

FIG. 4 is a flow chart of a method (400) for forming 3D latticed conductive element models, according to an example of the principles described herein. In the example depicted in FIG. 4, the input is an input matrix and the template is a template matrix. In this example, a halftone-based solution uses a template matrix to create the connected binary lattice structure with an average density as specified in an input matrix.

Accordingly, the method (400) includes obtaining (block 401) an input matrix that indicates a property of a conductive element to be printed. As described above, the obtaining (block 401) of the input matrix may be via manual entry by a user, or may be via analysis of a CAD file that defines the conductive element.

In this example, the template matrix is obtained through a series of computationally efficient operations. For example, a skeleton structure, as depicted in FIGS. 7A and 7B, is obtained (block 402). The skeleton structure defines lattice arms. From the skeleton structure, a ranked matrix is obtained (block 403) which ranked matrix defines an order in which elements of an array of voxels are to be deposited upon. From the ranked matrix, the template matrix is obtained (block 404). As described above, the template matrix defines a threshold against which the input matrix is compared to determine the structure of the latticed conductive element. From this template matrix, a latticed conductive element model is generated (block 405) by altering the lattice structures generated based on the input. FIGS. 5A-6B will now be referenced in describing an example of the generation of the latticed conductive element model. In the ensuing figures and description, the latticed conductive element model is described with a skeleton structure that is flat, i.e., without any arms in the z-direction. The process for generating a latticed conductive element model with any three-dimensional structure, however, is as depicted in the example.

In this example, an N×M×D matrix represents a volume of N×M×D voxels. This example illustrates how to determine whether or not to deposit conductive agent in each voxel in an N×M×D voxel volume based on input loading values in a corresponding N×M×D input matrix that specifies a desired agent loading in each location. The example below uses a 6×6×1 matrix representing a volume of voxels where N=6, M=6 and D=1. Voxel coordinates are presented below.

| | | | | | |
|---|---|---|---|---|---|
| (0, 0, 0) | (1, 0, 0) | (2, 0, 0) | (3, 0, 0) | (4, 0, 0) | (5, 0, 0) |
| (0, 1, 0) | (1, 1, 0) | (2, 1, 0) | (3, 1, 0) | (4, 1, 0) | (5, 1, 0) |
| (0, 2, 0) | (1, 2, 0) | (2, 2, 0) | (3, 2, 0) | (4, 2, 0) | (5, 2, 0) |
| (0, 3, 0) | (1, 3, 0) | (2, 3, 0) | (3, 3, 0) | (4, 3, 0) | (5, 3, 0) |
| (0, 4, 0) | (1, 4, 0) | (2, 4, 0) | (3, 4, 0) | (4, 4, 0) | (5, 4, 0) |
| (0, 5, 0) | (1, 5, 0) | (2, 5, 0) | (3, 5, 0) | (4, 5, 0) | (5, 5, 0) |

Let J represent the number of arms in the lattice structure. In this example, the lattice structure may include two arms crossing the matrix, i.e., J=2, with a first arm extending from (0,5,0) towards (5,0,0) and the second arm extending from (1,0,0) to (5,4,0). In the case more arms are desired, additional line segments may be defined across the region.

With the definition of the arms in the lattice, a distance is calculated for every coordinate (x,y,z) in the N×M×D region by finding the point on each arm that is closest to (x,y,z) and then evaluating the distance between (x,y,z) and this closest point on the closest lattice arm. If this process is repeated for every coordinate (x,y,z) and every line segment representing an arm in the lattice, the distance between each point (x,y,z) and the closest lattice arm is determined by choosing the minimum distance between (x,y,z) and a line segment representing a lattice arm, minimized over all the lattice arms. That is, for all (x,y,z), we compute:

$$\text{distance\_to\_closest\_arm}(x,y,z) = \min_j \text{distance\_between}(\text{point}(x,y,z) \ \& \ \text{arm } j)$$

In the example above, the matrix given by distance_to_closest_arm(x,y,z) may be represented as:

| | | | | | |
|---|---|---|---|---|---|
| 0.707 | 0.000 | 0.707 | 1.414 | 0.707 | 0.000 |
| 1.414 | 0.707 | 0.000 | 0.707 | 0.000 | 0.707 |
| 2.121 | 1.414 | 0.707 | 0.000 | 0.707 | 1.414 |
| 1.414 | 0.707 | 0.000 | 0.707 | 0.000 | 0.707 |
| 0.707 | 0.000 | 0.707 | 1.414 | 0.707 | 0.000 |
| 0.000 | 0.707 | 1.414 | 2.121 | 1.414 | 0.707 |

Notice that the distance between each point on the diagonals in the matrix and the diagonals defining the lattice (e.g., the lattice arms) is zero. As described above, from the skeleton structure, a ranked matrix is obtained (block 403). To convert this skeleton structure into a ranked matrix, an order is assigned to all coordinates (x,y,z). In this example, as there are 36 entries in this matrix, the ordering may assign a value 1 through 36 to each point (x,y,z) with the ordering being based on distances associated with each position (x,y,z). The model generator (FIG. 1, 102) may then sort the list and assign to each location (x,y,z) an order in the sorted list based on its distance_to_closest_arm(x,y,z).

Note that as in the example provided, there may be multiple locations that have the same distance to the closest line representing an arm. This behavior offers flexibility such that within the set of all points that are the same distance to the lattice arm, a rank may be arbitrarily assigned that suits certain application specifications. As an example, in one case the same ordering may be provided to every volume that is processed to render a lattice structure. In another example, the order of similarly-positioned points may be chosen at random. In yet another example, the order may be based on what has been printed on other regions up to a given point in time. One possible ranking matrix associated with the example structure above is as follows.

| | | | | | |
|---|---|---|---|---|---|
| 11 | 2 | 16 | 31 | 21 | 9 |
| 27 | 13 | 4 | 19 | 7 | 24 |
| 35 | 29 | 17 | 6 | 22 | 34 |
| 28 | 14 | 5 | 20 | 8 | 25 |
| 12 | 3 | 18 | 32 | 23 | 10 |
| 1 | 15 | 30 | 36 | 33 | 26 |

Note that the first ten ranks are those associated with a distance of 0 to the nearest arm. The order in this ranked matrix determines the order in which voxels should be specified to be filled with agent as a function of desired input agent loading amounts. Instead of listing this matrix as a set of numbers in an order, these values can be converted to spaced quantities in the range 0% to 100% to form the template, or threshold, matrix.

| | | | | | |
|---|---|---|---|---|---|
| 29.2 | 4.2 | 43.1 | 84.7 | 56.9 | 23.6 |
| 73.6 | 34.7 | 9.7 | 51.4 | 18.1 | 65.3 |
| 95.8 | 79.2 | 45.8 | 15.3 | 59.7 | 93.1 |
| 76.4 | 37.5 | 12.5 | 54.2 | 20.8 | 68.1 |
| 31.9 | 6.9 | 48.6 | 87.5 | 62.5 | 26.4 |
| 1.4 | 40.3 | 81.9 | 98.6 | 90.3 | 70.8 |

In this example, these threshold values are created via dividing each rank in the sorted list, minus 0.5, by the number of ranked values, in this case NM, i.e., threshold percent=100% (rank−0.5)*(NM)$^{-1}$. To compute a latticed conductive element model of where and where not to deposit a conductive agent, this template matrix can be compared to an input matrix of desired input agent loadings.

Figure 5A:
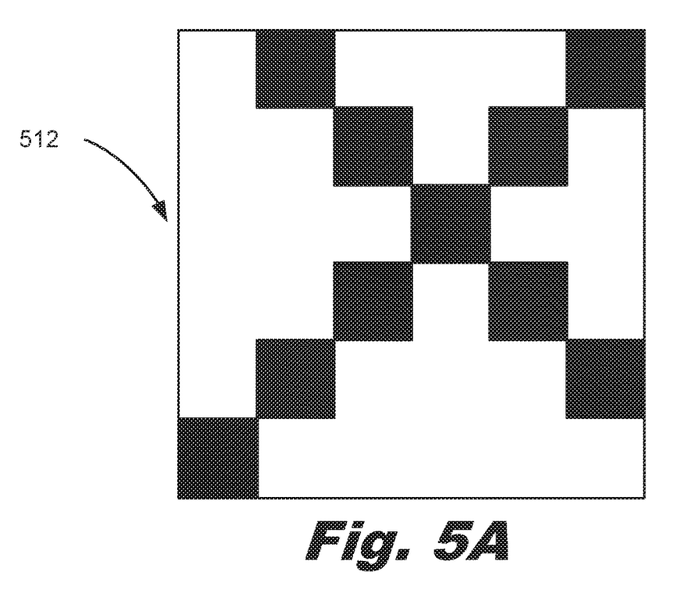
FIGS. 5A and 5B are two-dimensional views of a latticed conductive element model, according to an example of the principles described herein.
Figure 5B:
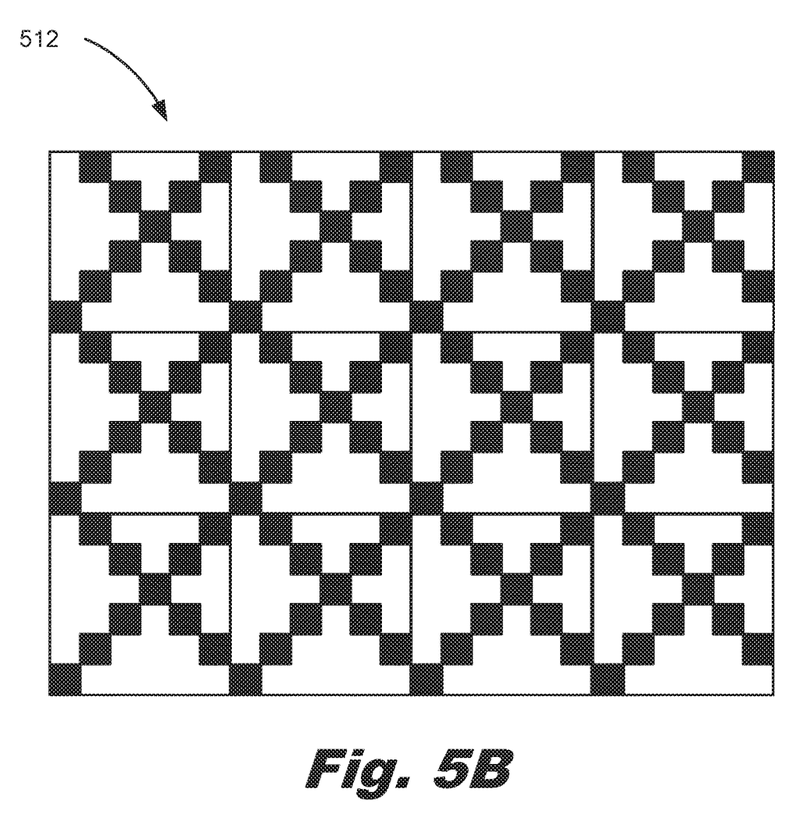

FIGS. 5A and 5B are views of a latticed conductive element model (512), according to an example of the principles described herein. Returning to the previous example, suppose that for this N×M×D region, a uniform conductive agent loading of 27% is desired. An input matrix for such a loading may be represented as indicated below:

| | | | | | |
|---|---|---|---|---|---|
| 27.0 | 27.0 | 27.0 | 27.0 | 27.0 | 27.0 |
| 27.0 | 27.0 | 27.0 | 27.0 | 27.0 | 27.0 |
| 27.0 | 27.0 | 27.0 | 27.0 | 27.0 | 27.0 |
| 27.0 | 27.0 | 27.0 | 27.0 | 27.0 | 27.0 |
| 27.0 | 27.0 | 27.0 | 27.0 | 27.0 | 27.0 |
| 27.0 | 27.0 | 27.0 | 27.0 | 27.0 | 27.0 |

In this example, a conductive agent may be applied at any position (x,y,z) where the threshold is below the target loading at that point. Represented as a matrix, this condition may look as described below where bolded cells indicate those voxels in the region that are to receive a conductive agent.

| 29.2 | 4.2 | 43.1 | 84.7 | 56.9 | 23.6 |
| 73.6 | 34.7 | 9.7 | 51.4 | 18.1 | 65.3 |
| 95.8 | 79.2 | 45.8 | 15.3 | 59.7 | 93.1 |
| 76.4 | 37.5 | 12.5 | 54.2 | 20.8 | 68.1 |
| 31.9 | 6.9 | 48.6 | 87.5 | 62.5 | 26.4 |
| 1.4 | 40.3 | 81.9 | 98.6 | 90.3 | 70.8 |

FIG. 5A depicts an image of such a latticed conductive element model (512) and FIG. 5B depicts an image of this same model repeated for several N×M×D regions.

As depicted in FIGS. 5A and 5B, the latticed conductive element model (512) may include a wrap-around feature. That is, for a 2D array, because the elements are tiled or tessellated, the top edge is connected to the bottom edge and the right edge is connected to the left edge as depicted in FIG. 5B. Accordingly, in such a system, the overall model depicted in FIG. 5B is symmetric.

Figure 6A:
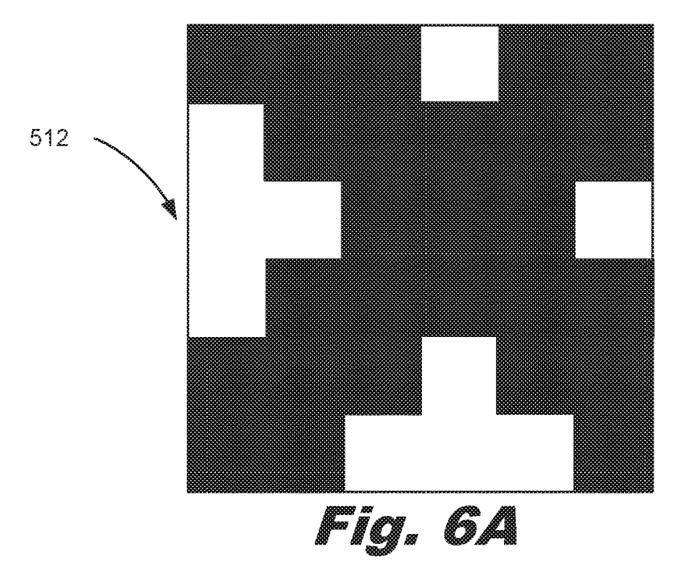
FIGS. 6A and 6B are two-dimensional views of a latticed conductive element model, according to an example of the principles described herein.
Figure 6B:
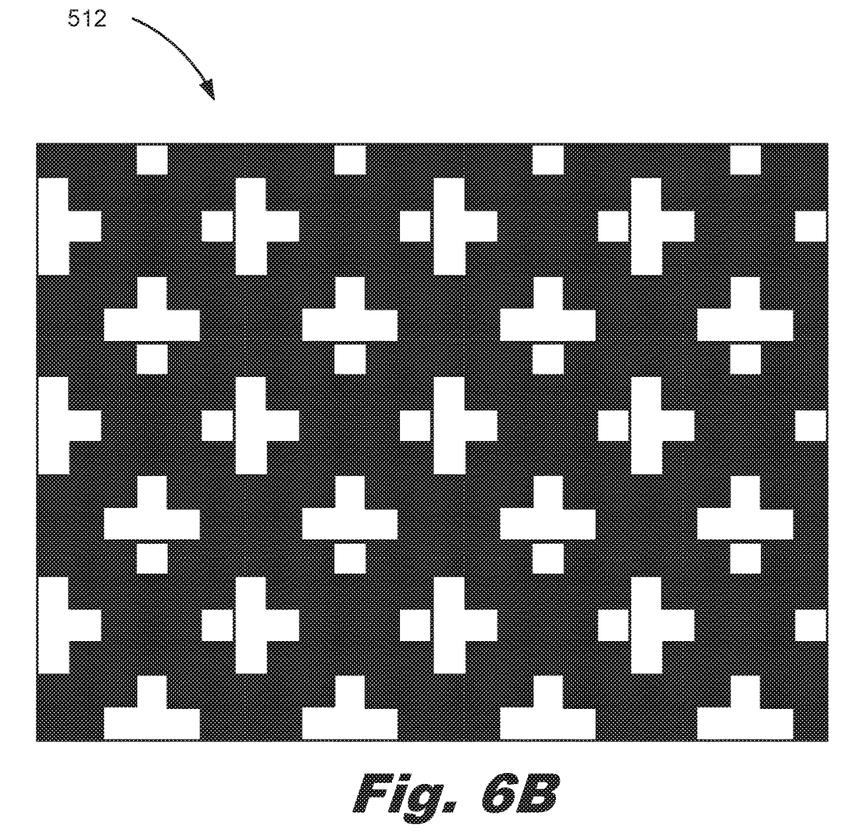
Figure 7A:
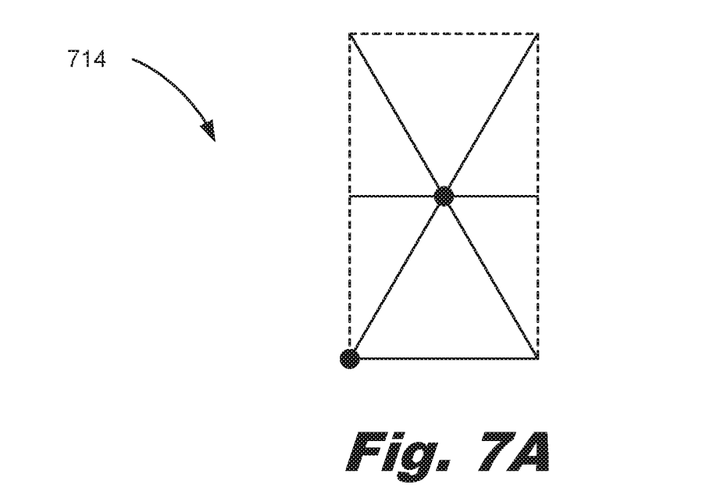
FIGS. 7A and 7B are views of a skeleton structure, according to an example of the principles described herein.
Figure 7B:
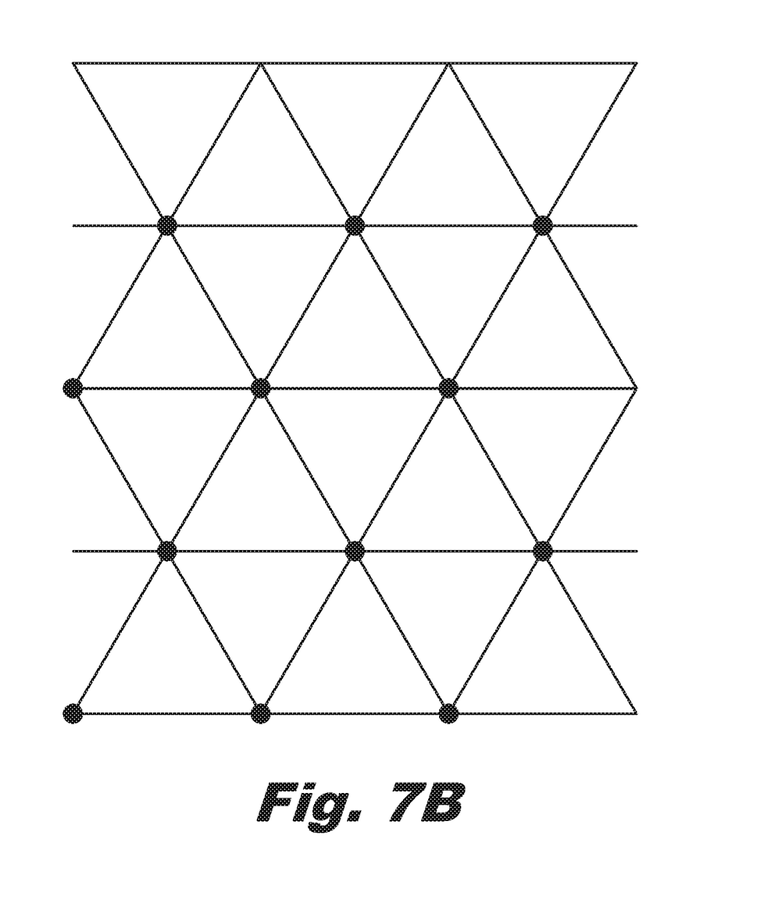

FIGS. 6A and 6B are views of a generated latticed conductive element model (512), according to an example of the principles described herein. Specifically, a denser structure may be formed by using a different input target loading. Suppose we have an input target loading matrix specifying a loading 73% indicated as a matrix below.

| 73.0 | 73.0 | 73.0 | 73.0 | 73.0 | 73.0 |
| 73.0 | 73.0 | 73.0 | 73.0 | 73.0 | 73.0 |
| 73.0 | 73.0 | 73.0 | 73.0 | 73.0 | 73.0 |
| 73.0 | 73.0 | 73.0 | 73.0 | 73.0 | 73.0 |
| 73.0 | 73.0 | 73.0 | 73.0 | 73.0 | 73.0 |
| 73.0 | 73.0 | 73.0 | 73.0 | 73.0 | 73.0 |

This input matrix may then be compared to the same template matrix to find a different set of locations (x,y,z) that are below the bolded values in the template matrix:

| 29.2 | 4.2 | 43.1 | 84.7 | 56.9 | 23.6 |
| 73.6 | 34.7 | 9.7 | 51.4 | 18.1 | 65.3 |
| 95.8 | 79.2 | 45.8 | 15.3 | 59.7 | 93.1 |
| 76.4 | 37.5 | 12.5 | 54.2 | 20.8 | 68.1 |
| 31.9 | 6.9 | 48.6 | 87.5 | 62.5 | 26.4 |
| 1.4 | 40.3 | 81.9 | 98.6 | 90.3 | 70.8 |

FIG. 6A depicts an image of such a latticed conductive element model (512) and FIG. 6B depicts an image of this same model repeated for several N×M×D regions. Note that while FIGS. 5A-6B depict a uniform input matrix, there is no restriction on how the input matrix is structured. Changes to the input matrix that specify the desired loading density as a function of space alter how the model generator (FIG. 1, 102) renders the lattice as a function of space, either over a single lattice structure volume, or over a region of multiple lattice structures. For example, the input matrix may have different percent loadings per column.

In some examples, assuming that the lattice is symmetric in x-, y- and z-dimensions, it may be possible to define lattice elements for a single octant of an N×M×D cell, and to reuse the entries for one octant appropriately.

In another example, the same approach may be used to construct matrices for a lattice defined in an N×M×D=6×6×6 voxel region. Suppose a lattice that is based on arms connecting similar corners is desired, based on a skeleton structure with J=3 arm segments. To construct the matrices, the model generator (FIG. 1, 102) defines a segment j=1 connecting (0,5,0) with (5,0,0), a segment j=2 connecting (1,0,0) with (5,4,0), and a segment j=3 connecting (3,0,3) with (3,5,3). All other operations may be performed as described above to generate the latticed conducive element model (512).

FIGS. 7A and 7B are views of a skeleton structure (714), according to an example of the principles described herein. As described above, the skeleton structure (714) defines lattice arms. FIG. 7A depicts one period of the skeleton structure (714) while FIG. 7B depicts a few instances of this period tessellated across a region which reveals the hexagonal structure. Note that in the single period of the skeleton structure, there are two posts indicated as circles. When the single period is replicated these posts from each period allow for the symmetric tiling indicated in FIG. 7B. In the example depicted in FIGS. 7A and 7B, the skeleton structure (714) is radially symmetric, where the lattice arms form equilateral triangles and regular hexagons.

Note that while FIGS. 5A-7B depict various packing arrangements, or different lattice forms, other shapes may be implemented in accordance with the principles described herein.

FIG. 8 is an isometric view of a latticed conductive element model (512), according to an example of the principles described herein. Specifically, FIG. 8 depicts a model (512) generated based on the skeleton structure (714) depicted in FIG. 7. As described above, the latticed conductive element model (512) may include multiple regions (210-1, 210-2, 210-3) of lattice structures, with different regions (210) calling for different densities of conductive agent to be deposited thereon. For example, the inner region (210-2) may have a higher density of conductive agent as compared with the exterior regions (210-1, 210-3).

In this example, the different regions (210) may be formed as different slices when 3D printing an object. That is, a first layer of powdered build material may be laid down and conductive agent disposed thereon in the pattern depicted in FIG. 8. Fusing agent may also be laid down on other areas of the 3D printed object to form the 3D printed object. In this example, adjacent regions (210) are separated from one another by unfused powder build material, or by powder build material that does not have conductive agent disposed thereon. Such a characteristic of the latticed conductive element may be defined by the template matrix. That is, the template matrix may not include descriptions of lattice arms that connect lattice structures in some dimensions.

After a few layers of powder build material, the second region (210-2) of the conductive element may be formed. As depicted in FIG. 8, the second region (210-2) may be thicker such that it is formed from multiple layers of powder build material being laid down and sintered.

FIG. 9 is an isometric view of a latticed conductive element model (512), according to an example of the principles described herein. In the example depicted in FIG. 9, the template matrix defines lattice arms that electrically connect adjacent regions (210) of lattice structures in the vertical direction. That is, the template matrix from which the latticed conductive element model (512) depicted in FIG. 9 was generated includes entries that define the vertically connecting lattice arms.

Figure 10:
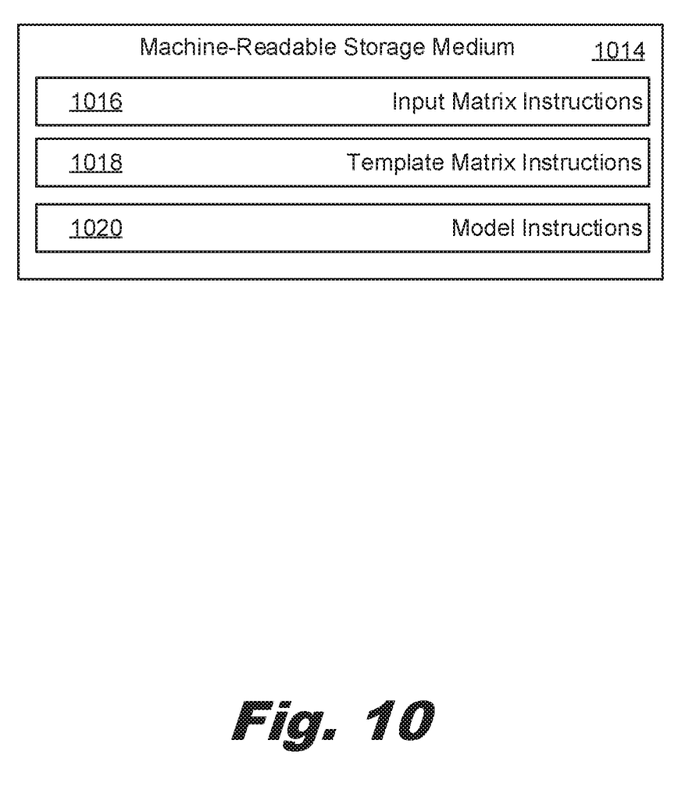
FIG. 10 depicts a non-transitory machine-readable storage medium for forming 3D latticed conductive elements, according to an example of the principles described herein.

FIG. 10 depicts a non-transitory machine-readable storage medium (1014) for forming 3D latticed conductive elements, according to an example of the principles described herein. To achieve its desired functionality, a computing system includes various hardware components. Specifically, a computing system includes a processor and a machine-readable storage medium (1014). The machine-readable storage medium (1014) is communicatively coupled to the processor. The machine-readable storage medium (1014)

includes a number of instructions (1016, 1018, 1020) for performing a designated function. The machine-readable storage medium (1014) causes the processor to execute the designated function of the instructions (1016, 1018, 1020). The machine-readable storage medium (1014) can store data, programs, instructions, or any other machine-readable data that can be utilized to operate an additive manufacturing system. The machine-readable storage medium (1014) can store computer readable instructions that the processor of the controller (FIG. 1, 104) can process, or execute. The machine-readable storage medium (1014) can be an electronic, magnetic, optical, or other physical storage device that contains or stores executable instructions. The machine-readable storage medium (1014) may be, for example, Random Access Memory (RAM), an Electrically Erasable Programmable Read-Only Memory (EEPROM), a storage device, an optical disc, etc. The machine-readable storage medium (1014) may be a non-transitory machine-readable storage medium (1014).

Referring to FIG. 10, input matrix instructions (1016), when executed by the processor, cause the processor to obtain an input matrix that indicates an electrical property of a conductive element to be printed. Template matrix instructions (1018), when executed by the processor, may cause the processor to obtain a template matrix which defines a lattice structure for the conductive element. Model instructions (1020), when executed by the processor, may cause the processor to generate a latticed conductive element model by generating multiple regions of the latticed conductive element, wherein different regions call for different densities of conductive compound to be deposited.

Such systems and methods 1) allow for printing of conductive elements in a 3D printed object; 2) simplify the incorporation of electrical components into a 3D printed object by reducing the number of components placed in/on the 3D printed object; 3) reduce the constraints caused from placing lumped electrical components in/on the 3D printed object; 4) conserve conductive agent used to form electrical components; 5) ensure dimensional accuracy of conductive components as well as of the 3D printed object; 6) provide an enhanced conductivity-to-metal ratio; 7) provide a tailored directional asymmetry; 8) increase thermal control of conductive traces as well as of the surrounding 3D printed object; and 9) enhance mechanical properties while maintaining higher conductivity. However, it is contemplated that the systems and methods disclosed herein may address other matters and deficiencies in a number of technical areas.

What is claimed is:

1. A system, comprising:
   a model generator comprising a processor and memory to:
   obtain an input that indicates a property of a conductive element to be printed;
   obtain a template which defines a lattice structure for the conductive element; and
   generate a latticed conductive element model based on the template and the input; and
   a three-dimensional printing controller to trigger selective hardening of build material to form the latticed conductive element.

2. The system of claim 1, wherein the model generator generates a latticed conductive element model by altering a thickness of lattice arms of the lattice structure.

3. A method, comprising:
   obtaining, by a processor, an input that indicates a property of a conductive element to be printed;
   obtaining, by the processor, a template which defines a lattice structure for the conductive element; and
   generating, by the processor, a latticed conductive element model based on the template and the input.

4. The method of claim 3, wherein the property is selected from the group consisting of:
   a density of conductive agent to create a fully-filled conductive element;
   a type of conductive element; and
   a target electrical property for the conductive element.

5. The method of claim 3, wherein
   the input is an input matrix; and
   the template is a template matrix.

6. The method of claim 5, wherein obtaining the template matrix comprises:
   obtaining a skeleton structure which defines a lattice structure;
   obtaining a ranked matrix which defines an order in which elements of an array of voxels are to be deposited upon; and
   obtaining the template matrix which defines a threshold against which the input matrix is compared to determine the characteristics of the latticed conductive element.

7. The method of claim 3, wherein the input indicates the property per unit length of the conductive element.

8. The method of claim 3, wherein generating a latticed conductive element model comprises generating multiple regions of the latticed conductive element model.

9. The method of claim 8, wherein different regions call for different densities of conductive agent to be deposited.

10. The method of claim 9, wherein exterior regions call for a lower density of conductive agent to be deposited as compared to interior regions.

11. The method of claim 3, wherein the template defines lattice arms to electrically connect adjacent regions.

12. The method of claim 3, wherein adjacent regions are separated from one another by non-conductive regions of build material.

13. A non-transitory machine-readable storage medium encoded with instructions executable by a processor, the machine-readable storage medium comprising instructions to:
   obtain an input matrix that indicates an electrical property of a conductive element to be printed;
   obtain a template matrix which defines a lattice structure for the conductive element; and
   generate a latticed conductive element model by generating multiple regions of the latticed conductive element model, wherein different regions call for different densities of conductive agent to be deposited.

14. The non-transitory machine-readable storage medium of claim 13, wherein the input matrix indicates a variable electrical property along a length of the conductive element to be printed.

15. The non-transitory machine-readable storage medium of claim 14, wherein ends of the conductive element to be printed have a higher density of conductive compound as compared to a center of the conductive element.

* * * * *